(12) United States Patent
Schmidt

(10) Patent No.: US 10,583,621 B1
(45) Date of Patent: Mar. 10, 2020

(54) PROCESS FOR FORMING A GUSSETFREE GLOVE OF A STRETCHABLE FABRIC AND GLOVE FORMED THEREBY

(71) Applicant: Ann L. Schmidt, Houston, TX (US)

(72) Inventor: Ann L. Schmidt, Houston, TX (US)

( * ) Notice: Subject to any disclaimer, the term of this patent is extended or adjusted under 35 U.S.C. 154(b) by 159 days.

(21) Appl. No.: 15/724,850

(22) Filed: Oct. 4, 2017

Related U.S. Application Data

(63) Continuation-in-part of application No. 14/967,660, filed on Dec. 14, 2015, now abandoned.

(51) Int. Cl.
*A41D 19/02* (2006.01)
*B29D 99/00* (2010.01)
*A41D 19/00* (2006.01)
*B29L 31/48* (2006.01)

(52) U.S. Cl.
CPC ..... *B29D 99/0067* (2013.01); *A41D 19/0072* (2013.01); *B29L 2031/4864* (2013.01)

(58) Field of Classification Search
CPC ............ A41D 19/0006; A41D 19/0072; A41D 19/0051; A41D 19/0058; A61F 5/3761; A47G 25/015
USPC ...................................... 2/169, 161.2, 161.9
See application file for complete search history.

(56) References Cited

U.S. PATENT DOCUMENTS

| | | | |
|---|---|---|---|
| 1,423,546 A | 7/1992 | Speer | |
| 6,654,965 B2 | 12/2003 | Hockwuth | |
| 6,895,599 B1 | 5/2005 | Templer | |
| 7,000,257 B2 * | 2/2006 | Bevier | A41D 19/01523 2/159 |
| 7,000,553 B1 * | 2/2006 | Wang | A42B 1/06 112/475.11 |
| 2004/0025221 A1 * | 2/2004 | Clark | A41D 19/0006 2/159 |
| 2010/0192280 A1 * | 8/2010 | McClard | B41J 2/325 2/161.8 |
| 2013/0104285 A1 | 5/2013 | Nolan | |
| 2013/0232662 A1 * | 9/2013 | Williams | A41D 19/001 2/164 |
| 2015/0196830 A1 * | 7/2015 | Lien | A63B 71/148 2/161.1 |

* cited by examiner

Primary Examiner — Timothy K Trieu

(74) Attorney, Agent, or Firm — Egbert Law Offices, PLLC

(57) ABSTRACT

A process for forming a glove includes the steps of placing a second layer of a stretchable fabric on top of a first layer stretchable fabric, forming a seam by stitching through the first and second layers of stretchable fabric, trimming around an exterior of the seam through the first and second layers of stretchable fabric so as to separate a glove shape from the first and second layers of stretchable fabric, and turning the first and second layers of stretchable fabric inside out so as to form the glove. The stitching is of a repeatable stitch pattern in which a first stitch extends from a first point to a second point, a second stitch extends from the second point to a third point, a third stitch which extends from the third point back to the first point, and a fourth stitch extending from the first point to a fourth point.

12 Claims, 5 Drawing Sheets

PROCESS FOR FORMING A GUSSETFREE GLOVE OF A STRETCHABLE FABRIC AND GLOVE FORMED THEREBY

CROSS-REFERENCE TO RELATED APPLICATIONS

The present application is a continuation-in-part of U.S. patent application Ser. No. 14/967,660, filed on Dec. 14, 2015, and entitled "Process for Forming a Gussetless Glove", presently pending.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to the manufacture of gloves. More particularly, the present invention the relates to the manufacture of gloves that do not have gussets for the fingers of the glove. The present invention also relates to the manufacture of gloves of a stretchable fabric material. Additionally, the present invention relates to a unique stitch seam configuration or "repeating" stitch pattern used in the manufacture of such gloves which enhances the of appearance, functionality and integrity of the glove.

2. Description of Related Art Including Information Disclosed Under 37 CFR 1.97 And 37 CFR 1.98

A glove is a garment covering the entire hand. Gloves have separate sheaths or openings for each finger and the thumb. If there is an opening but no covering sheath for each finger, they are called fingerless gloves. Gloves which cover the entire hand or first but do not have separate finger openings or sheaths are called mittens.

Gloves protect and comfort hands against cold or heat, against ultraviolet radiation, damage by friction, abrasion or chemicals, and disease. They can also function as a guard for a bare hand. Gloves are made of materials including cloth, knitted or a felted wool, leather, rubber, latex and neoprene. In virtually all fingered gloves, gussets are required so as to create a depth for the finger between the palm-side material of the glove and the backhand side of the glove.

The use of gussets greatly complicates the manufacture of gloves through additional fabric cuts for the gussets and sewing steps required to add them to each finger for both the back side and palm side. In simple terms, gusseted gloves are manufactured by cutting six pattern pieces: (1) a back of hand piece; (2) a palm piece; (3) a gusset between the little finger and ring finger; (4) a gusset between the ring finger and the middle finger; (5) a gusset between the middle finger and the index finger; and (6) a thumb piece which is partially sewn separately, then inserted. As such, gussets must be added between the palm side material of the glove and the backhand side of the glove so as to create finger sheaths. Whenever these gussets are required, the manufacture of the gloves becomes more complex, involves more steps, and is more time-consuming. As such, a need has developed whereby gloves can be manufactured without the need for gussets.

In certain circumstances, it would be desirable to have a glove formed of a stretchable fabric material. The stretchable fabric material is typically LYCRA™ or SPANDEX™ or other fibers that allow stretch to occur. The stretchable fabric can also be fabrics that are woven in such a way that allows mechanical stretch. In U.S. patent application Ser. No. 14/967,660, the parent to the present application, it was disclosed that a glove could be formed without gussets of a stretchable fabric material. In experiments conducted with products produced by the process of this parent application, a zigzag stitch was used for forming the seam of the glove between the layers of stretchable material. This resulted in the problem that each stitch was visible when the stretch fabric is fully stretched and the stretch is maintained. Additionally, it was found that if a maximum amount of stretch was applied to the gloves, the stitch could break so as to cause a mechanical unlocking of the seam. This could create an unattractive appearance or render the garment unusable. As such, a need has developed so as to create a rather "invisible" seam between the layers of stretchable fabric which effectively allows for the stretch of the fabric while maintaining the structural integrity of the thread used for the stitch and the seam. It was found that if straight stitches were used for forming the seam, the glove would not be able to properly stretch, the fabric would pucker, and the thread would break.

Many persons desire to have a decorative pattern on the outwardly facing backhand side of the material of the glove. This decoration adds unique aesthetics to the glove. The decoration on the backhand side of the glove can be particular to an individual such that the glove is usually purchased based upon the pattern or decoration on the backhand side of the glove.

Machine embroidery is an embroidery process whereby a sewing machine equipped with an attachable embroidering unit or embroidering machine is used to stitch software-created designs on textiles. These patterns are used commercially in product branding, corporate advertising, and uniform adornment. Hobbyists also machine embroider for personal sewing and craft projects. There are multiple types of machine embroidery. Much commercial embroidery is still done with link stitch embroidery in which the patterns may be manually or automatically controlled. More modern computerized machine embroidery utilizes an embroidery machine or a sewing/embroidery machine that is controlled with a computer that will embroider stored patterns. These computerized embroidery machines can have multiple heads and threads.

Most modern embroidery machines are computer-controlled and specifically engineered for embroidery. Industrial and commercial embroidery machines and combination sewing-embroidery machines have a hooping or framing system that holds the framed area of fabric taut under the sewing needle and moves it automatically to create a design from a pre-programmed digital embroidery pattern.

Specially designed hoops for embroidery sewing machines have been used for the purpose of embroidery. Most hoop work is performed on sturdy or woven cottons and other fabrics, including knits. However, under those circumstances, the goal is to add an embroidery design (such as a flower) to a finished product (such as a purchased article of clothing) or to a quilt square that will be part of a project. Herebefore, there been no embroidery designs that allow a finished article of clothing or other type of project using stretchable fabric within the loop. The pre-set stitches for commercially produced embroidery designs are created for hooping firm woven fabric, such as cotton quilting, or lighter fabrics of a firm weave that have no stretch. The pre-set stitch choices for application to a custom design that one would create with digitizing software are also useful for the aforementioned fabrics, but not for stretchable fabrics. If the pre-set stitches were used on stretchable fabric, the fabric would pucker, ripple and, in general, push out of shape. In addition, a free-standing item, when finished, would have rigid seams that would be compromised under actual use. As such, there has been a need to be able to use stretchable fabrics in the embroidery hoop with specific digitized software settings.

Curved seams, such as fingertips and inner curves between fingers, are difficult to sew on stretchable fabrics by using a regular sewing machine or serger machine. As a result, gussets are incorporated when forming gloves since the finger portion of the palm and the back of hand are stretched open so that when the gusset fabric is attached, the seam can be sewn in a straight line. Herebefore, it was not believed useful to attempt to sew curves on stretchable fabrics. The serger machine is incapable of maneuvering along a tight curve. The use of a sewing machine would allow a certain amount of fabric "slip", would not produce a stretchy seam without thread breaking, and would produce a seam that shows stitch marks. As such, it is not believed possible to prepare a finished glove configuration using only two pieces of stretchable fabric that would be sturdy and hold its shape.

In the past, various patents and patent application publications have been issued relating to the manufacture of gloves. For example, U.S. Pat. No. 1,423,546, issued on Jul. 25, 1922 to J. L. Speer, describes a reversible glove. This reversible glove includes inner and outer gloves fitting one within the other and united to form a single composite glove. The unfinished seams of the inner glove face the unfinished seams of the outer glove such that the single glove may be reversed and worn on the opposite hand.

U.S. Pat. No. 6,895,599, issued on May 24, 2005 to J. A. Templer, shows reversible interchangeable stretch fashion gloves. This glove of stretch construction material allows one size to fit all. The stretch is used to an advantage for its utility to adjust for the discrepancy between the natural and glove construction positions of the thumb. The glove is therefore ambidextrous. The glove used has four displays, in which an inside color is one, an outside contrasting color is two, and contrasting colors on one hand and on the other hand are three and four. The change of the glove color surface is achieved by turning the glove inside out.

U.S. Patent Application Publication No. 2013/0104285, published in May 2, 2013 to M. Nolan, shows a seamless knit glove that has electrically conductive finger regions, defined by either pads or threads. The glove is worn by a user to enable operation of a capacitive touchscreen on an electronic device. The seamless knit glove finger sleeves, anterior palm side and posterior backside are knit as a unitary structure which has a high degree of stretch. The glove needs no finger-linking operation to attach the sleeves to the anterior and posterior glove regions.

U.S. Patent Application Publication No. 2013/0232662, published on Sep. 12, 2013 to C. Williams, describes a method of manufacturing an article of clothing. The process for manufacturing a glove comprises stretching an outer layer inside-out over a glove form, such that an interior surface of the outer layer faces outward. A liner has a first side and a second side opposite the first side which is cut from a fabric, such as fleece. An adhesive is deposited in an adhesive pattern on to the first side of the liner. The adhesive fuses to the interior surface of the outer layer in a heat/pressure procedure, thereby affixing the first side of the liner to the interior surface of the outer layer to form a glove. The glove is removed from the glove form and inverted to have the right-side-out configuration, thereby compressing the outer layer and the liner.

U.S. Pat. No. 6,654,965, issued on Dec. 2, 2003 to P. Hockwuth, discloses a goalkeeper glove. This glove includes a thumb and forefinger linking together a gusset space. The thumb and the forefinger form part of the inner hand surface of the glove. A gusset is located in the gusset space. An edge seam is associated with each of a thumb region and a forefinger region. A flexible gusset layer is provided in the gusset space on the inner hand surface and secured with the edge seams associated with the thumb and the forefinger. The gusset layer has a tear-resistant free edge extending between the two edge seams and spaced from the gusset along the palm by at least one-fourth of the thumb length.

It is an object of the present invention to provide a process for forming a gusset-free glove which allows for a close stretch fit by using stretchable fabric for the glove.

It is another object of the present invention to provide a process for forming a gusset-free glove which creates a somewhat invisible seam such that threads do not show when the glove is stretched on to the hand.

It is another object of the present invention to provide a process for forming a gusset-free glove which has a lock to the stitch to avoid ripping the stitch and breaking the thread used for the stitch while allowing the seam to maintain stretch capability.

It is another object of the present invention to provide a process for forming a gusset-free glove which allows stretchable fabric to be used for the glove.

It is still another object of the present invention to provide a process for forming a gusset-free glove which allows for a smooth transition of the fabrics at the seam.

It is another object of the present invention to provide a process for forming a gusset-free glove which allows different colors of fabric to appear on separate surfaces of the glove.

It is another object of the present invention to provide a process for forming a gusset-free glove which reduces bulk in the glove and forms a slim silhouette.

It is another object of the present invention to provide a process for forming a gusset-free glove which full finger sleeves are created with the glove as well as a fingerless option in which the tip that covers the ends of the fingers is omitted so as to expose the fingernails.

It is another object of the present invention to provide a process for forming a gusset-free glove in which the glove is easily adapted to the size of the hand.

It is another object of the present invention to provide a process for forming a gusset-free glove which allows an embroidered pattern to be provided on the outwardly-facing backhand side of the glove.

It is another object of the present invention to provide a process for forming a gusset-free glove in which the glove can be made efficiently, simply and easily.

It is another object of the present invention to provide a process for forming a gusset-free glove which can utilize a machine's embroidery hoop along with hand-digitized computer setting so as to achieve a unique glove outline.

It is still another object of the present invention to provide a process for forming a gusset-free glove which include a digitally-created stretchable seam stitch that avoids the need to manually manipulate the fabric to effect a seam.

It is another object of the present invention to provide a process for forming a gusset-free glove which the glove can be manufactured for minimal cost.

It is another object of the present invention to provide a process for forming a gusset-free glove which includes a stretchable material that will not unravel or fray.

It is still another object of the present invention to provide a process for forming a gusset-free glove in which a decorative pattern on the outwardly-facing backhand side of the glove is customizable.

It is still further object of the present invention to provide a process for forming a gusset-free glove in which glove can be made to various lengths or maybe hemmed or unhemmed.

These and other objects and advantages of the present invention will become apparent from a reading of the attached specification and appended claims.

BRIEF SUMMARY OF THE INVENTION

The present invention is a process that includes the steps of: (1) placing a second layer of stretchable fabric on top of a first layer of stretchable fabric; (2) forming a seam by stitching together the first and second layers of stretchable fabric by a repeating stitch pattern; (3) trimming around an exterior of the seam and through the first and second layers of stretchable fabric so as to separate a glove shape from the first and second layers of stretchable fabric; and (4) turning the first and second layers of stretchable fabric of the glove shape inside out so as to form a glove.

The stitching of the repeating stitch pattern include stitching a first stitch from first point to a second point, stitching a second stitch extending from the second point to a third point, stitching a third stitch extending from the third point back to the first point, and stitching a fourth stitch from the first point to a fourth point. These steps are repeated along a length of the seam. The first stitch is of a vertical orientation through the first and second layers of stretchable fabric, the second stitch is a horizontal stitch through the first and second layers of stretchable fabric. The third stitch is a diagonal stitch extending through the first and second layers of stretchable fabric. The fourth stitch is a horizontal stitch through the first and second layers of stretchable fabric.

The first layer of stretchable fabric is placed face up on top of a hooped stabilizer sheet and secured by stitching around the edge of the fabric. A desired pattern is embroidered upon the first layer stretchable fabric. The second layer of stretchable fabric is placed face down over the first layer of stretchable fabric and secured by stitching around the edge of the fabric. The glove outline is stitched through both layers of fabric. Both pieces of fabric and the stabilizer, all connected by the stitches, are removed from the hoop. The glove outline is cut just outside the seam and straight across the open wrist to free the glove from the remaining materials. The glove is put under running water to dissolve the stabilizer. The glove is then dried. The present invention is also a glove that includes a first layer of stretchable fabric having a shape corresponding to a desired glove shape and a second layer of stretchable fabric having a shape corresponding to the desired glove shape. The first and second layers are joined by a seam extending therethrough. The seam is formed by a stitching pattern. The stitching pattern includes a first stitch extending from a first point to a second point, a second stitch extending from a second point to a third point, a third stitch extending from the third point back to the first point, and a four stitch extending from the first point to a fourth point.

The first stitch is of a vertical orientation through the first and second layers of stretchable fabric. The second stitch is a horizontal stitch through the first and second layers of stretchable fabric. The third stitch is a diagonal stitch through the first and second layers of stretchable fabric. The fourth stitch is a horizontal stitch through the first and second layers of stretchable fabric. The first and second layers of stretchable fabric have no gusset positioned therebetween.

The present invention is also a stitching process for joining a first layer of the stretchable fabric to a second layer of stretchable fabric. The stitching process includes the steps of: (1) stitching a first stitch from a first point to a second point; (2) stitching a second stitch extending from the second point to a third point; (3) stitching a third stitch extending from the third point back to the first point; and (4) stitching a fourth stitch from the first point to a fourth point. The first stitch is of a vertical orientation through the first and second layers of fabric. The second stitch is a horizontal stitch through the layers of stretchable fabric. The third stitch is a diagonal stitch through the first and second layers of stretchable fabric. The fourth stitch is a horizontal stitch through the first and second layers of stretchable fabric. The steps of stitching are repeated along a length of the seam.

This foregoing Section is intended to describe, with particularity, the preferred embodiments of the present invention. It is understood that modifications to these preferred embodiments can be made within the scope of the present invention. As such, this Section should not to be construed, in any way, as limiting of the broad scope of the present invention. The present invention should only be limited by the following claims and their legal equivalents.

DETAILED DESCRIPTION OF THE INVENTION

Figure 1:
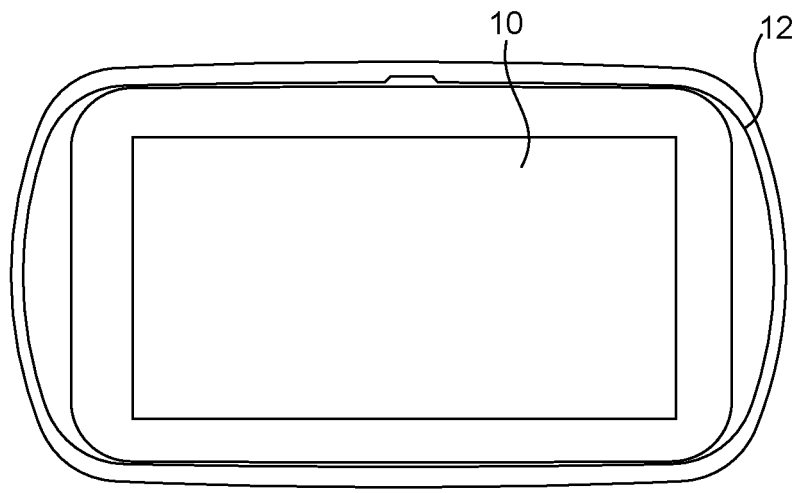
FIG. 1 is a plan view of an initial step of the process of the present invention in which a stabilizer sheet is secured into a hoop.

Referring to FIG. 1, there shown the initial step in the process of the present invention. In this initial step, a stabilizer sheet 10 is fixed onto an embroidery hoop 12. The hoop 12 is of a type that can be employed in association with machine embroidery. The stabilizer sheet 10 is the means that secures the fabrics and allows the digitized stitches to be properly placed upon the fabric as the hoop moves during the machine embroidery. The stabilizer 10 can be of various types, such as cut-away, tear-away, water-soluble, heat removable, thermoplastic, open mesh, and combinations thereof. In the preferred embodiment the present invention, the stabilizer sheet 10 is a water-soluble wash-away type of stabilizer material.

As can be seen in FIG. 1, the stabilizer sheet is secured between inner and outer hoop sections of the hoop 12. The hoop 12 can then be attached to the machine. An X and Y drive mechanism moves the hoop under the needle following the design coordinates created when the design is digitized for embroidery.

Figure 2:
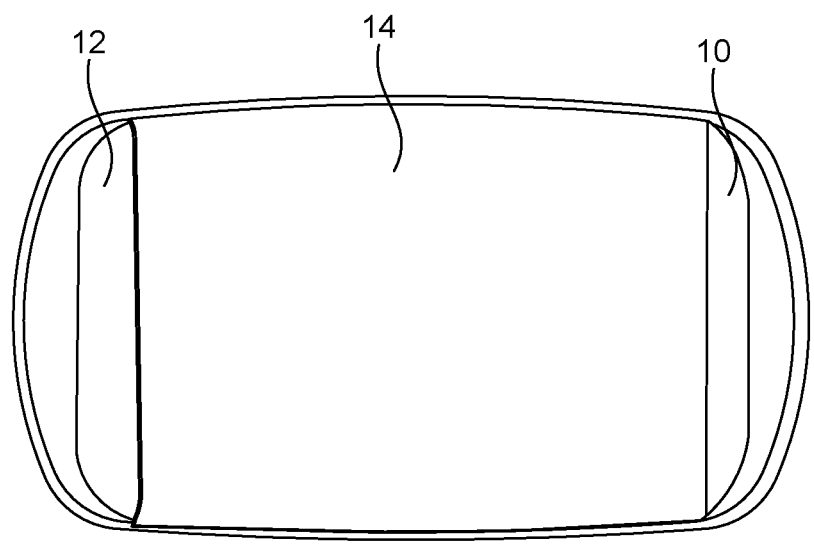
FIG. 2 is a plan view of the process of the present invention in which a first layer of stretchable fabric is placed upon the stabilizer sheet.

FIG. 2 shows a further step in the process of the present invention. In FIG. 2, there is a first layer of stretchable fabric 14 that is placed upon the stabilizer sheet 10. This first layer of stretchable fabric can include an elastane material, such as SPANDEX™ or LYCRA™. The stretchable fabric can also include a material that is woven in such a way as to allow for mechanical stretch. The stretchable fabric 14 on top of the hoop 12 is secured via a border outline stitch so as to move in conjunction with the movement of the hoop 12 during the embroidering of the first layer of stretchable fabric 14.

Figure 3:
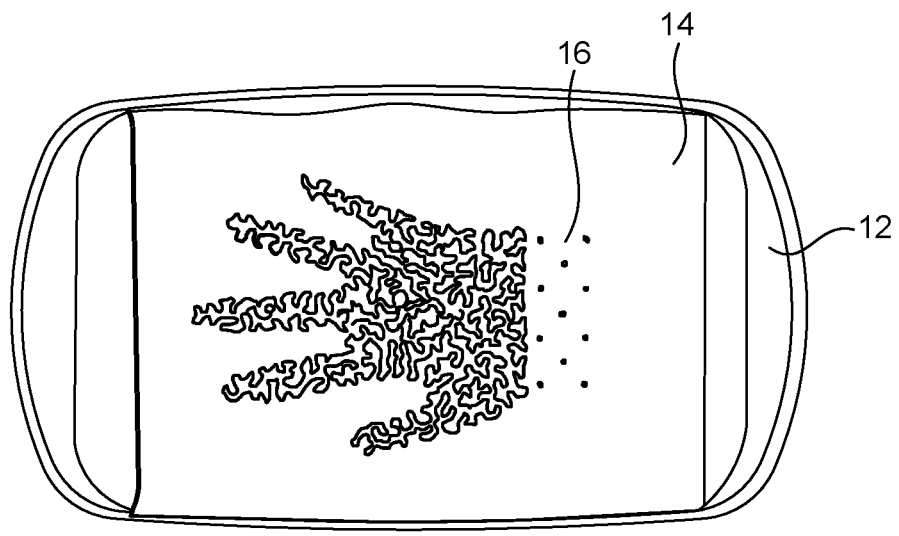
FIG. 3 is a plan view of another step in the process of the present invention in which a design is embroidered onto the first layer of stretchable fabric.

FIG. 3 shows a further step in the process of the present invention. As can be seen, there is a desired design 16 that has been embroidered onto the first layer of stretchable fabric 14 and through the stabilizer sheet 12. In order to embroider this design, the embroidery machine is started and monitored. The embroidered design 16 can include more than one color and can also involve additional processing for appliques or other special effects. The desired design 16 can be configured so as to fit the desires of the user. For example, the desired design 16 may in the nature of an emblem or an insignia for a business, sports club, or organization. Alternatively, the desired design 16 can just be a fanciful design that users find attractive. Ultimately, this desired design 16 will be formed on the outwardly facing backhand side of the ultimate glove created by the present invention.

Figure 4:
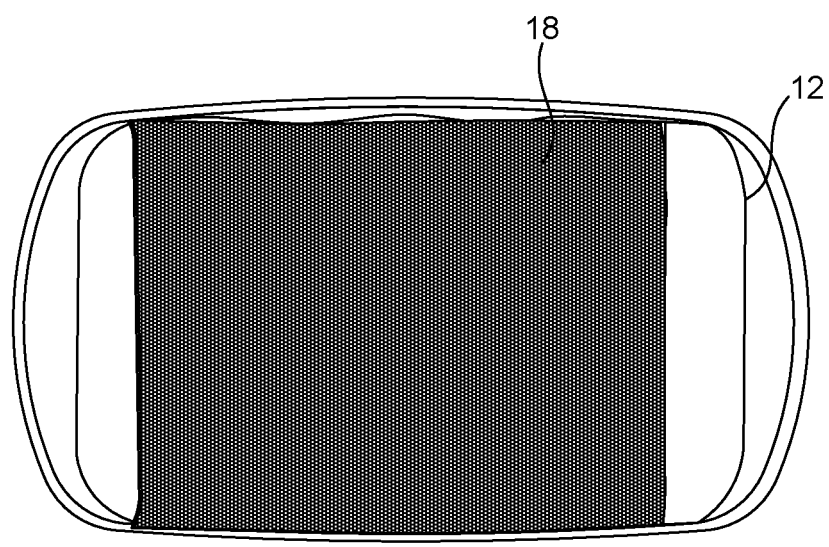
FIG. 4 is a further step in the process of the present invention in which a second layer of stretchable fabric is placed upon the first layer of stretchable fabric.

FIG. 4 shows a further step in the process of the present invention. In FIG. 4, a second layer of stretchable fabric 18 is placed upon the first layer of stretchable fabric 14 and over the desired design 16. The second layer of stretchable fabric 18 also laid atop the hoop 12 and the stabilizer sheet 10. Ultimately, the second layer of stretchable fabric will form the palm side of the glove. Within the concept of the present invention, the second layer of stretchable fabric 18 can be the same color as the first layer of stretchable fabric 16 or it can be of a different color.

Figure 5:
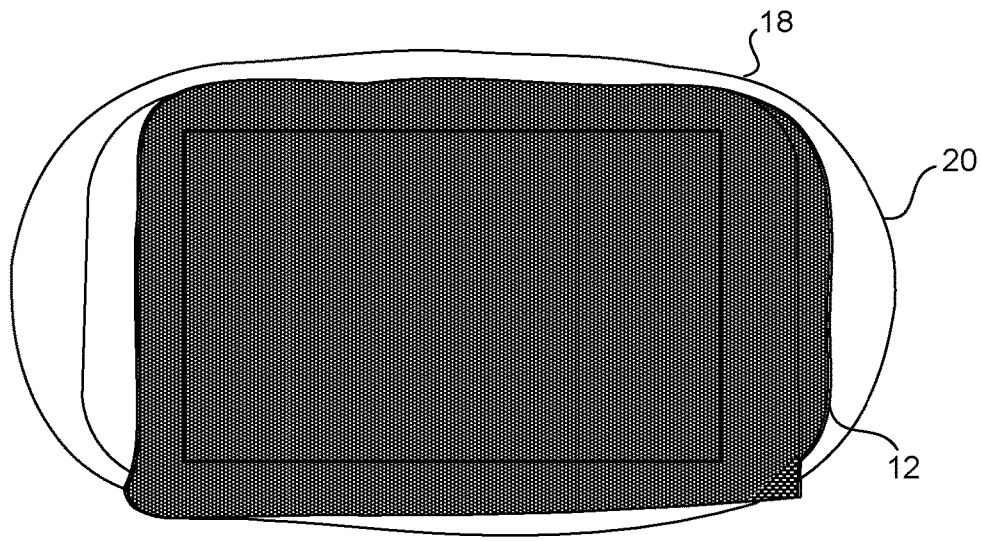
FIG. 5 is a plan view of further step of the process of the present invention in which an outline is stitched on the first and second layers of stretchable fabric.

FIG. 5 shows that an outline 20 has been formed in the second layer of stretchable fabric 18 and will also be stitched through the first layer of stretchable fabric 14 and through the stabilizer sheet 10. This occurs while the hoop 12 is manipulated by the embroidery machine.

Figure 6:
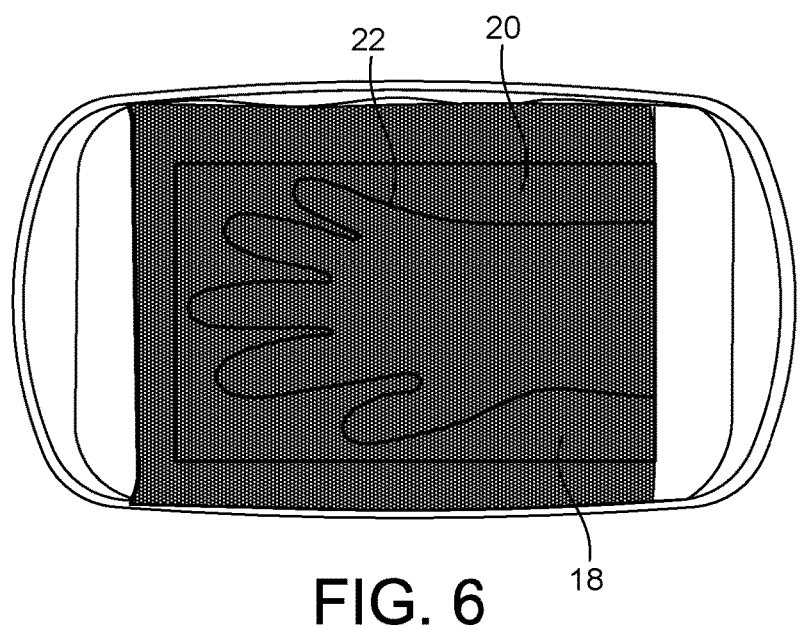
FIG. 6 is a plan view of further step of the process of the present invention in which a desired glove outline is embroidered onto the first and second layers of stretchable fabric.

FIG. 6 is a further step in the process of the present invention in which a glove outline 22 is stitched utilizing a specifically created stitch pattern within the outline 20 and through the second layer of stretchable fabric 18 and through the first layer of stretchable fabric 14 and through the stabilizer 10. It can be seen that this outline 22 resembles a hand with a stitching forming a seam. This can be can particularly configured by measuring the hand of the desired user or creating the glove outline 12 to fit standard glove sizes. Since the first and second layers of stretchable fabric are used in the present invention, the accuracy of the dimensions of the glove outline 22 are not critical. The ultimate glove will stretch and contract to fit the hands. In other circumstances, computer-created designs can configure the glove outline 12 by photographically measuring a user's hand.

Figure 6A:
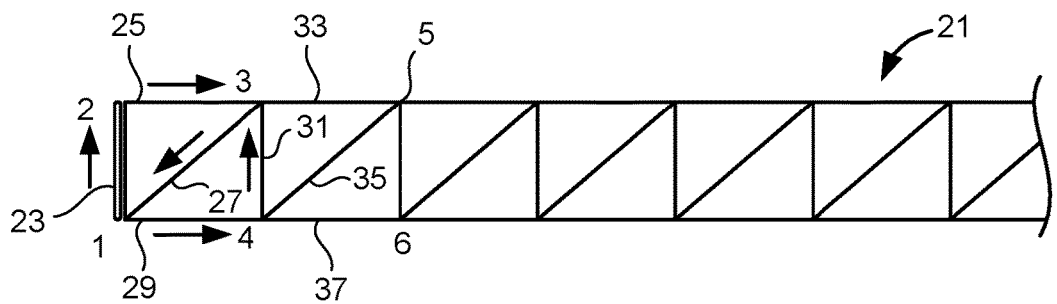
FIG. 6A is an enlarged illustration of the unique stitch pattern for joining the first and second layers of stretchable fabric.

As can be seen in FIG. 6A, there shown the stitching 21 for the seam that follows outline 20 in FIG. 6 between the first and second layers of stretchable fabric. This stitching pattern 21 is of a unique configuration which facilitates the ability for the stretchable fabric to stretch in the seam while, at the same time, effectively locking the stretch of the seam so as to avoid ripping out of the seam or breaking of the thread used for the stitching. In particular, it can be seen that there is a first stitch 23 which extends from a point 1 to a point 2. A second stitch 25 extends from point 2 to a point 3. A third stitch 27 extends from point 3 back to point 1. A fourth stitch 29 extends from point 1 to point 4. Afterwards, a repeating pattern of stitching occurs along the length of the stitching pattern 21. As can be seen, in the next repeating pattern, there is a stitch 31 that extends from point 4 to point 3. Another stitch 33 extends from point 3 to point 5. Another stitch 35 will extend from point 5 back to point 4. Finally, stitch 37 extends from point 4 to a point 6.

The stitch 23 has a relative vertical orientation extending through the first and second layers of stretchable fabric. The second stitch 25 has a relative horizontal orientation through the first and second layers of stretchable fabric. The third stitch 27 is a diagonal stitch extending through the first and second layers of stretchable fabric. The fourth stitch 29 has a relative horizontal stitch through the first and second layers of stretchable fabric. Similarly, stitch 31 (starting the repeating pattern of the stitching) has a relative vertical orientation through the first and second layers of stretchable fabric. The stitch 33 is a horizontal stitch extending through the first and second layers of stretchable fabric. The stitch 35 is a diagonal stitch extending through the first and second layers of stretchable fabric. The stitch 37 is another horizontal stitch the first and second layers of stretchable fabric. It should be noted that the first stitch 23, if placed at the beginning of the stitching pattern is a locking stitch which can be formed by several closely placed vertically-oriented threads. This pattern will repeat itself at the end of the seam and at the end of the repeating pattern of stitching.

The stitching pattern 21 is designed for stretch fabrics that contain LYCRA™ or SPANDEX™, along with other fibers that allow stretch. It can also be used for fabrics woven in such a way which allow mechanical stretch. Besides the embroidery mode, the stitching pattern can be added to machine sewing as a stitch through the use of proper software applied to the machine.

It should be noted that on conventional sewing machines, the zigzag stitch (and variations thereof) is used for sewing stretch fabrics. This results in a problem of each stitch being visible when the stretch fabric is fully stretched and maintains that stretch. The stitch pattern 21 of the present invention does not show the stitch points that appear at the seams when stretched. This results in a smooth transition of fabrics at the seams. Furthermore, it allows both stretch and lock so that the stitches cannot be pulled out with reasonable force, such as when the seam is stretched to pull the glove on and pull it off. A zigzag seam can be ripped out since it is easily overstretched even with reasonable force. The stitch pattern 21 also allows material of different colors to be placed on opposite sides of the glove since the seam will be virtually invisible. This presents a unique and aesthetically pleasing appearance to the glove.

Figure 7:
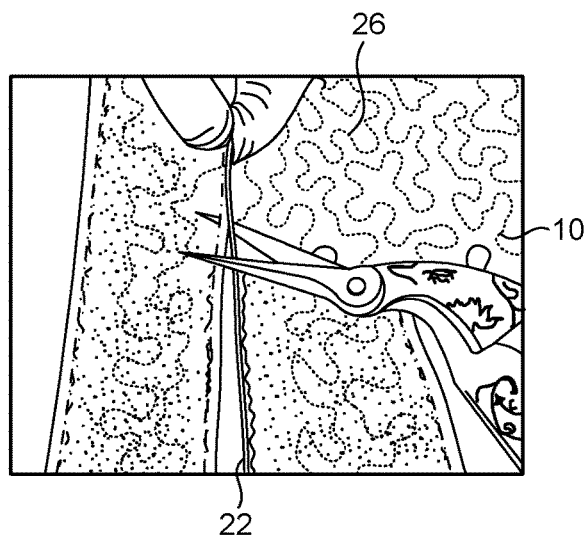
FIG. 7 is a plan view of a further step in the process of the present invention in which the glove shape is separated from the remaining layers of stretchable fabric.

FIG. 7 is a further step in the process of the present invention in which the glove outline 22 is being trimmed from the stabilizer sheet 10 and from the first and second layers of stretchable fabric. As can be seen in FIG. 7, the first layer of stretchable fabric 14, the second layer of stretchable fabric 18 and the stabilizer sheet 10 have been removed from the hoop 12. The stabilizer sheet 10 is illustrated as facing the observer of FIG. 7. It can be seen that the glove outline 22 has been carried out so that the stitch is through each of the layers of stretchable fabric and the stabilizer 10. A scissors, or other tool, can be utilized so as to trim around the outside of the glove outline 22. This separates the glove outline 22 from the remaining portions of the first layer of stretchable fabric 14, the second layer of stretchable fabric 18 and the stabilizer 10. As such, this separated glove outline 22 will present an actual glove shape 26.

Figure 8:
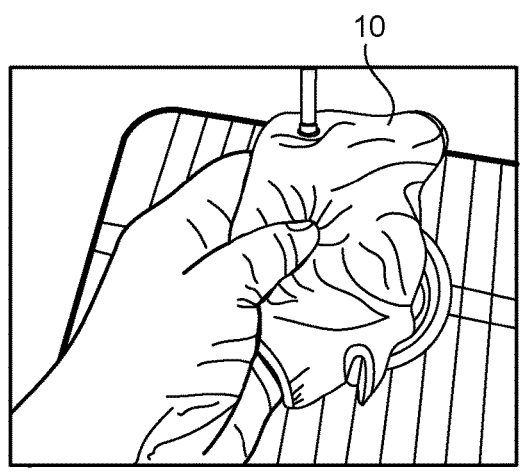
FIG. 8 shows still a further step in the process of the present invention in which the stabilizer is washed from the layers of stretchable fabric.

FIG. 8 shows a further process of the present invention. In particular, FIG. 8 shows that the stabilizer sheet 10 is being washed so as to remove the stabilizer sheet 10 from the first and second layers of stretchable fabric of the glove shape 26. Since the stabilizer 10 is a wash-away type of stabilizer, the application of water to the stabilizer sheet 10 will effectively dissolve the stabilizer sheet 10 such that only the first and second layers of stretchable fabric remain.

Figure 9:
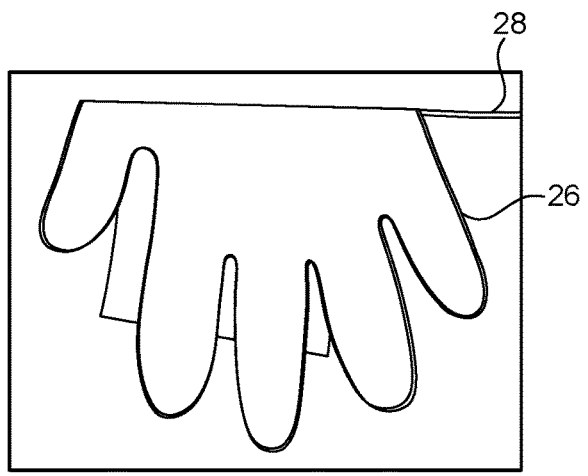
FIG. 9 is a further view of the process of the present invention in which the glove shape is dried following the step of washing.

FIG. 9 shows a further step in the process of the present invention in which the glove shape 26 is placed upon a line 28 for drying. In this configuration, the washed glove shape 26 is left to air dry. In other circumstances, hair dryers, clothes dryers, blowers, or other low heating devices can be utilized so as to facilitate the drying of the washed glove shape 26.

Figure 10:
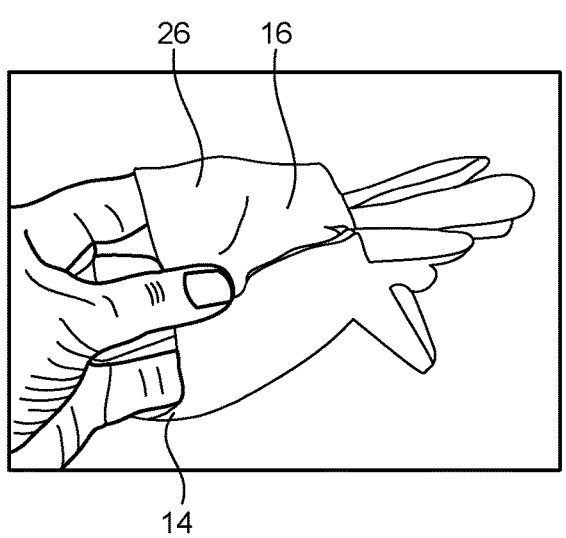
FIG. 10 shows a final step of the process of the present invention in which the glove shape is turned inside out so as to create the glove.

FIG. 10 illustrates a further step in the process of the present invention in which the glove shape 26 is turned inside out. As such, the desired pattern 16 will appear on the outer surface of the glove. The palm portion and the finger portions are also turned inside out so that the first layer of stretchable fabric 14 appears on the outside of the glove and the second layer of stretchable fabric also appears on the outside of the glove.

Figure 11:
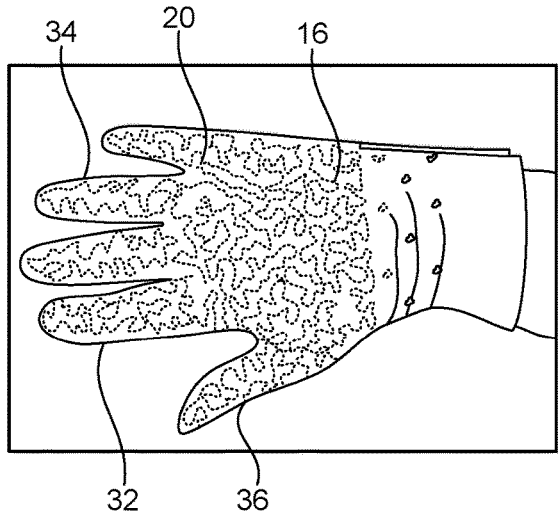
FIG. 11 shows the application of the glove of the present invention upon a human hand with the backhand side shown.

FIG. 11 shows the final glove 30 as applied to a human hand 32. As can be seen, the desired pattern 16 will appear on the outwardly facing backhand side of the glove. Each of the fingers of the human hand 32 are accommodated within the finger sheaths 34 of the glove 30. Additionally, the thumb can reside within the thumb sheath 36 of glove 30. It can be seen in FIG. 11, that the glove 30 creates a desirable aesthetic effect on the backhand side of the glove.

Figure 12:
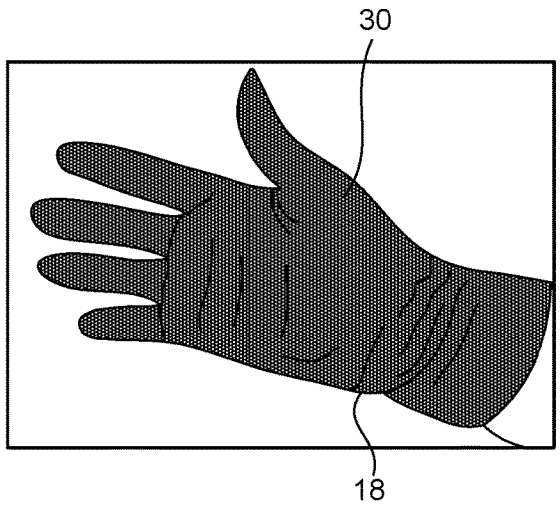
FIG. 12 illustrates the glove of the present invention as applied to a human hand with the palm side shown.

FIG. 12 shows the palm side of the glove 30. The second layer of stretchable fabric 18 is illustrated as the palm side. This palm side is of an undecorated form.

Figure 13:
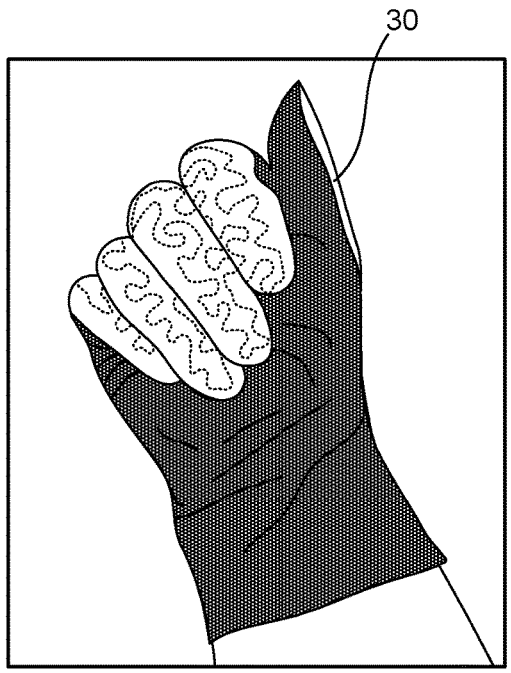
FIG. 13 is an illustration of the completed glove of the present invention showing the relationship between the back side of the glove with the palm side of the glove.
Figure 14:
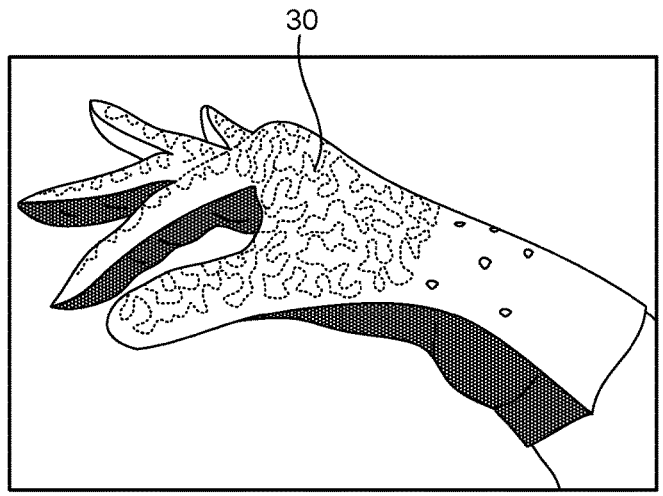
FIG. 14 is a side elevational view of the finished glove of the present invention showing the unique configuration that is achieved between the palm side fabric and the back side fabric.

FIGS. 13 and 14 represent the look of the glove of the present invention. These illustrate the relationship of the palm side fabric and the backhand side of the fabric when the hand is in motion. FIGS. 13 and 14 represent the fashion contrast when different colored fabrics are used for the palm side and the backhand side of the glove. The present invention presents a unique seam as compared to the gusset. It also creates a slenderizing effect to the hand. The look achieved by the glove the present invention is very unique to the method for achieving this glove configuration.

As can be seen throughout the preceding figures, the glove 30 of the present invention does not include gussets. As such, the present invention avoids the complicated sewing and stitching required for the integration of such gussets. The glove to the present invention presents a slimming appearance because of the lack of gussets. The glove of the present invention is suitably stretchable so as to fit a wide variety of hand sizes. The present invention accommodates the entire fingers of the user or can be made in a fingerless version. The glove 30 of the present invention allows any embroidered design to be presented on the backhand side of the glove. The glove is manufactured efficiently, and easily and simply. The use of the material associated with the first and second layers of stretchable fabric are knitted in a way that will not unravel or fray. Ultimately, the glove can be customizable to the desires of the user.

The uniqueness of using stretchable fabrics in the hoop with specific embroidery hoop digitizing software settings makes the formation of the glove of the present invention possible. In the past, most of the hoop work is performed on sturdy woven cottons and other fabrics, including knits. However, in the past, the goal was to add an embroidery design (such as a flower) to a finished product (such as a purchased article of clothing) or to a quilt square that will become part of a project. The present invention utilizes an embroidery pattern to achieve a finished article of clothing in which the finished article of clothing utilizes a stretchable fabric. This is achieved through the use of the hoop.

In the past, stretchable fabrics have been difficult to sew on curves (such as the fingertips) using a regular sewing machine or serger machines. As such, gussets have been required for gloves in the past. The use of the embroidery hoop makes it possible to eliminate the gusset. The embroidery stitches in the hoop are digitized using specialized embroidery software with specific setting choices, including a unique stitch for the glove outline seam. As a result, the finished glove, as shown in FIGS. 13 and 14, has a sturdy but stretchable seam that holds its shape. The embroidery digitizing is a significant factor in creating these gloves.

The foregoing disclosure of the invention is illustrative and explanatory thereof. Various changes in the steps of the described process can be made within the scope of the present claims without departing from the true spirit of the invention. The present invention should only be limited by the following claims and their legal equivalents.

I claim:

1. A process for forming a glove without gussets, the process comprising:
   placing a second layer of stretchable fabric on top of a first layer of stretchable fabric;
   forming a seam by stitching through said first and second layers of stretchable fabric, the stitching being of a repeating stitch pattern, the step of forming a seam by stitching comprising:
       stitching a first stitch from a first point to a second point, the first stitch being of a relative vertical orientation through the first and second layers of stretchable fabric;
       stitching a second stitch from the second point to a third point, the second stitch having a relative horizontal orientation through the first and second layers of stretchable fabric;
       stitching a third stitch extending from the third point back to the first point, the third stitch having a diagonal orientation extending through the first and second layers of stretchable fabric;
       stitching a fourth stitch from the first point to a fourth point, the fourth stitch being a relative horizontal stitch through the first and second layers of stretchable fabric; and
       repeating the steps of stitching along a length of the seam;
   trimming around an exterior of the seam and through the first and second layers of stretchable fabric so as to separate a glove shape from the first and second layers of stretchable fabric; and
   turning the first and second layers of stretchable fabric of the glove shape inside out so as to form the glove.

2. The process of claim 1, further comprising:
   placing the first layer stretchable fabric on top of a stabilizer sheet prior to the step of placing the second layer of stretchable fabric on top of the first layer of stretchable fabric.

3. The process of claim 2, further comprising:
   embroidering a desired pattern upon the first layer of stretchable fabric prior to the step of placing the second layer of stretchable fabric upon the first layer of stretchable fabric.

4. The process of claim 2, further comprising:
   removing the stabilizer sheet from the first and second layers of stretchable fabric.

5. The process of claim 2, further comprising:
   hooping the stabilizer sheet onto a hoop prior to the step of placing the first layer of stretchable fabric on the top of the stabilizer sheet.

6. The process of claim 2, further comprising:
   washing the stabilizer sheet from the first and second layers of stretchable fabric.

7. The process of claim 2, the step of placing the first layer of stretchable fabric on the stabilizer sheet comprising:
   positioning the first layer of stretchable fabric on the top of the stabilizer sheet with a top side up such that the top side corresponds to a backhand side of the glove.

8. The process of claim 7, the step of positioning comprising:
   positioning the second layer of stretchable fabric on top of the first layer of stretchable fabric with a bottom side thereof facing the top side of the first layer of stretchable fabric, the bottom side corresponding to a palm side of the glove.

9. The process of claim 7, each of the first and second layers of stretchable fabric comprising an elastane material.

10. A glove comprising:
    a first layer of stretchable fabric having a desired glove shape; and
    a second layer of stretchable fabric having the desired glove shape, the first and second layers of stretchable fabric being joined by a seam extending therearound, said seam formed of a stitching pattern, the stitching pattern comprising:
        a first stitch extending from a first point to a second point;
        a second stitch extending from the second point to a third point;
        a third stitch extending from the third point back to the first point; and
        a fourth stitch extending from the first point to a fourth point, the first stitch being of a relative vertical orientation extending through the first and second layers of stretchable fabric, the second stitch being of a relative horizontal orientation through the first and second layers of stretchable fabric, the third stitch being a diagonal stitch extending through the first and second layers of stretchable fabric, the fourth stitch being of a relative horizontal orientation through the first and second layers of stretchable fabric, the first and second layers of stretchable fabric having no gusset positioned therebetween or thereon.

11. The glove of claim 10, each of the first and second layers of stretchable fabric being of an elastane material.

12. A stitching process for joining a first layer of stretchable fabric to a second layer of stretchable fabric, the stitching process comprising:
    stitching a first stitch from a first point to a second point;
    stitching a second stitch extending from the second point to a third point;
    stitching a third stitch extending from the third point back to the first point;
    stitching a four stitch from the first point to a fourth point; and
    repeating the steps of stitching along the length of the seam, the first stitch being of a relative vertical orientation extending through the first and second layers of stretchable fabric, the second stitch being a relative horizontal orientation through the first and second layers of stretchable fabric, the third stitch being a diagonal stitch extending through the first and second layers of stretchable fabric, the fourth stitch being of a relative horizontal orientation extending through the first and second layers of stretchable fabric.

* * * * *